United States Patent [19]

Yamada et al.

[11] Patent Number: 5,285,285
[45] Date of Patent: Feb. 8, 1994

[54] METHOD OF CONTROLLING FIRST ITEMS THAT REQUIRE PRIOR CRT DISPLAY AND SECOND ITEMS THAT REQUIRE NO PRIOR DISPLAY

[75] Inventors: Hisafumi Yamada, Tokyo; Mitsumasa Saitoh; Shigeyuki Sano, both of Kanagawa; Takao Itabashi, Tokyo, all of Japan

[73] Assignee: Sony Corporation, Tokyo, Japan

[21] Appl. No.: 875,396

[22] Filed: Apr. 29, 1992

[30] Foreign Application Priority Data

Apr. 30, 1991 [JP] Japan ................... 3-126676

[51] Int. Cl.⁵ .................... H04N 5/44; H04N 5/445
[52] U.S. Cl. .................... 348/570; 348/734; 348/725
[58] Field of Search ............ 358/192.1, 188, 194.1, 358/191.1; H04N 5/44, 5/445, 5/50, 5/57, 5/60

[56] References Cited

U.S. PATENT DOCUMENTS

| | | | |
|---|---|---|---|
| 4,270,145 | 5/1981 | Farina | 358/188 |
| 4,340,908 | 7/1982 | Wakabayashi | 358/192.1 |
| 4,626,892 | 12/1986 | Nortrup | 358/188 |
| 4,907,082 | 3/1990 | Richards | 358/188 |
| 5,103,313 | 4/1992 | Chan | 358/192.1 |

Primary Examiner—Mark R. Powell
Assistant Examiner—Chris Grant
Attorney, Agent, or Firm—Lewis H. Eslinger; Jay H. Maioli

[57] ABSTRACT

Items related to the quality of an on-screen image such as brightness, sharpness, chroma, etc. and items related to the audio quality such as bass, treble, balance, etc. in a CRT display, such as a television receiver, are subject to adjustment by a user. These items are originally classified into those in a first class and those in a second class in accordance with the nature of a respective item, that is, whether a user must know the current analog value of the item before he or she adjusts it. When an instruction is input through user's manipulation to adjust the analog value of an item to be controlled, the system determines whether the item belongs to the first class or the second class. If it belongs to the first class, the system first confirms that the item and its actual analog value are displayed on a screen, then permits adjustment of the analog value in response to the instruction, and then displays a new analog value. If it belongs to the second class, the system permits immediate adjustment of its analog value and displays a new analog value.

3 Claims, 3 Drawing Sheets

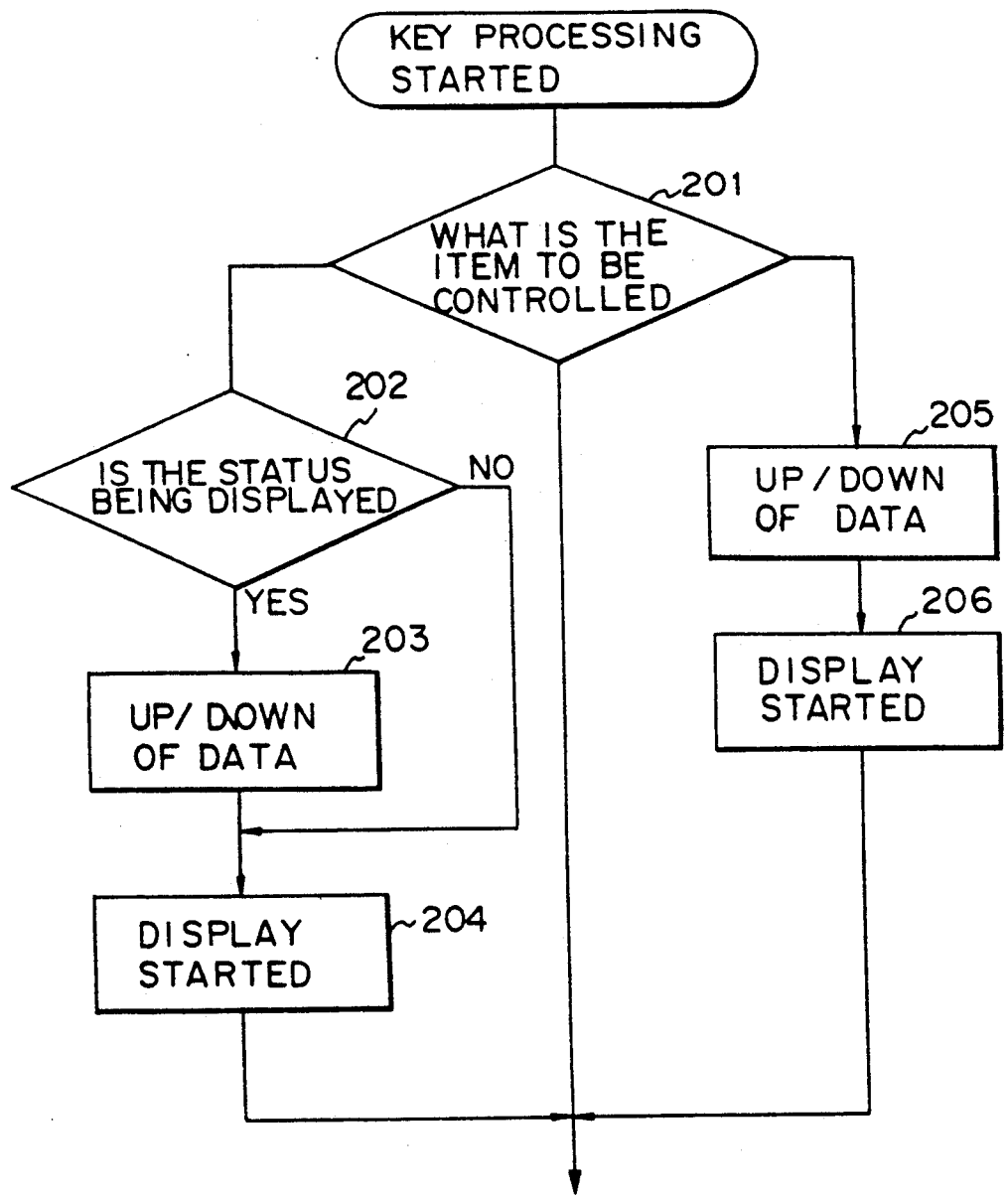

METHOD OF CONTROLLING FIRST ITEMS THAT REQUIRE PRIOR CRT DISPLAY AND SECOND ITEMS THAT REQUIRE NO PRIOR DISPLAY

BACKGROUND OF THE INVENTION

1. Field of the Invention

This invention relates to a method for displaying a controlled status and, more particularly, to an improvement of display on a screen effected upon adjustment of a CRT display.

2. Description of the Prior Art

A recent type of television receivers is configured to display on its screen the amount of a respective item to be adjusted when a user adjusts the volume, the tone, the hue, the brightness, and so forth. There are, in general, two types of on-screen display shown below.

The first type is such that a current analog value is first displayed on a screen in order to permit a user to select a desired analog value with reference to the current analog value through key manipulation, and a new analog value selected is displayed on the screen.

The second type is such that a new analog value selected by a user through key manipulation is directly displayed on a screen.

In order for a user to control an analog value for control of a CRT display such as a television receiver, he or she needs knowledge on the current status before the intended control for some of such items to be controlled, but need not know it for the other items.

Examples of items for which a user must know the current status, such as identification of the item, its current analog value, and so on, are: brightness, sharpness, phase, chroma, and so on, related to the image display status; and bass, balance, and so on, related to the audio quality.

For such items for which a user must know the current status, the first type on-screen display is necessary. That is, an analog value that has been set heretofore must be displayed before control manipulation.

Examples of items for which a user need not known the current status are: contrast, related to the condition of image display; and volume, related to the audio quality.

For such items for which a user need not know the current status, the second type on-screen display on a screen is desired. That is, it is sufficient that a new analog value selected by a user through key manipulation be directly displayed on the screen.

Existing television receivers, however, do not clearly distinguish the use of the above-mentioned types of on-screen display in accordance with the necessity of confirmation of the current status of a respective item to be controlled.

For example, when a user wants to control one of the items: brightness, sharpness, phase and chroma, the current analog value must be displayed on the screen before the control manipulation. Actually, however, this is not done so in some cases. Therefore, the existing television receivers are not always convenient for users.

OBJECT AND SUMMARY OF THE INVENTION

It is therefore an object of the invention to provide a method for displaying a controlled status, which clearly distinguishes the use of the types of on-screen display in accordance with the necessity of confirmation of the current status of a respective item to be controlled.

According to an aspect of the invention, there is provided a method for displaying a controlled status in a system including a manipulating key for adjusting a plurality of items to be controlled, a control unit coupled to the manipulating key for generating a control signal for adjustment, a signal processor responsive to the control signal for controlling a video signal or an audio signal, and a CRT display for simultaneously displaying a video signal from the signal processor and an adjusting value of the control signal on a screen, comprising the steps of:

receiving an instruction signal from the manipulating key and identifying that the item to be controlled is of a first type or a second type;

if the item to be controlled is identified to be of the first type, confirming that a current controlled value is being displayed on the display unit, and then permitting adjustment by the instruction signal; and if the item to be controlled is identified to be of the second type, permitting adjustment by the instruction signal.

The above, and other, objects, features and advantage of the present invention will become readily apparent from the following detailed description thereof which is to be read in connection with the accompanying drawings.

BRIEF DESCRIPTION OF THE DRAWINGS

FIG. 3 is a flow chart showing operations of the processor unit.

DETAILED DESCRIPTION OF THE PREFERRED EMBODIMENTS

Figure 1:
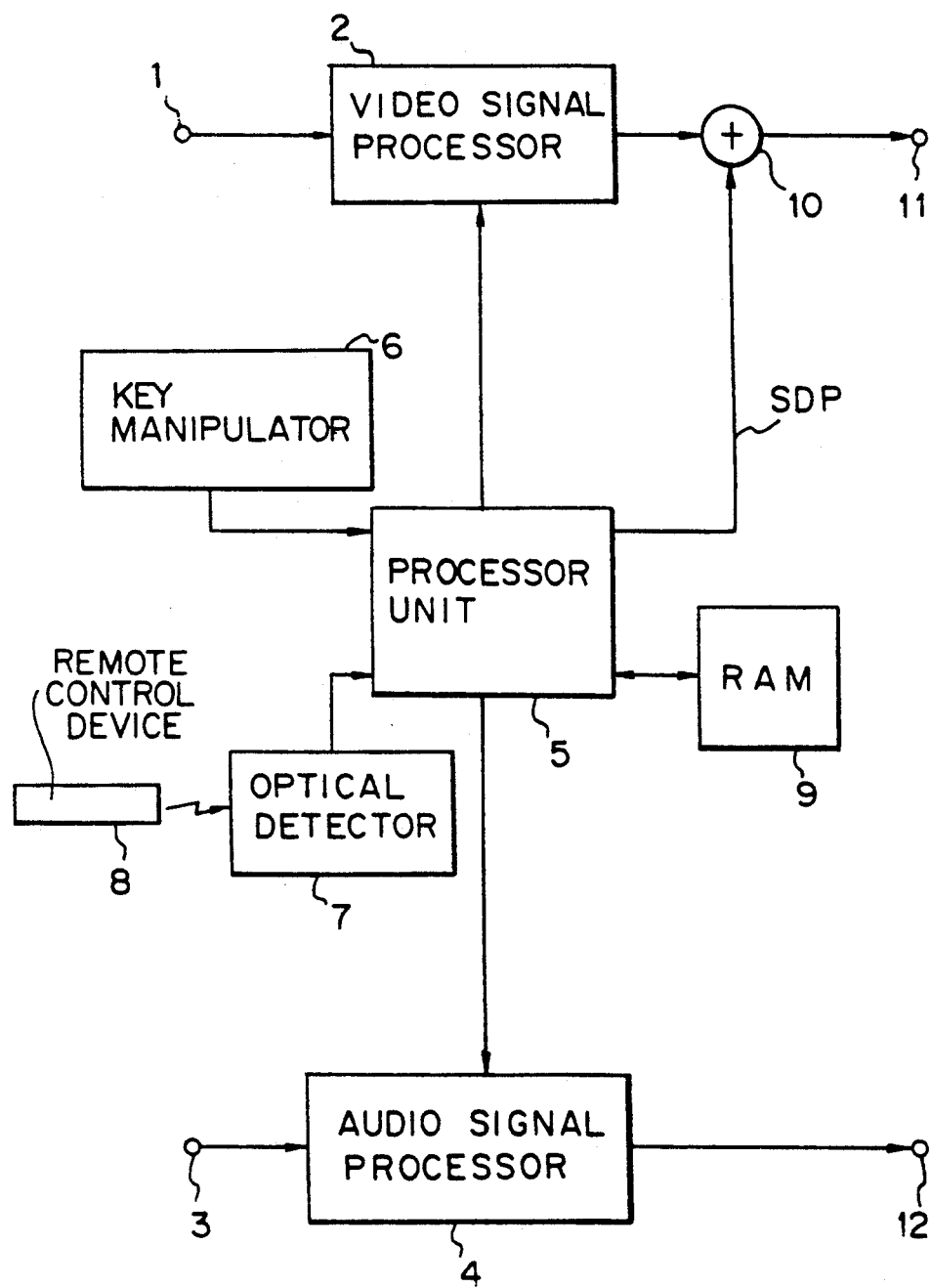
FIG. 1 is a block diagram of a circuit for discriminating a controlled status and for making an on-screen display signal which can be applied to the present invention.
Figure 2:
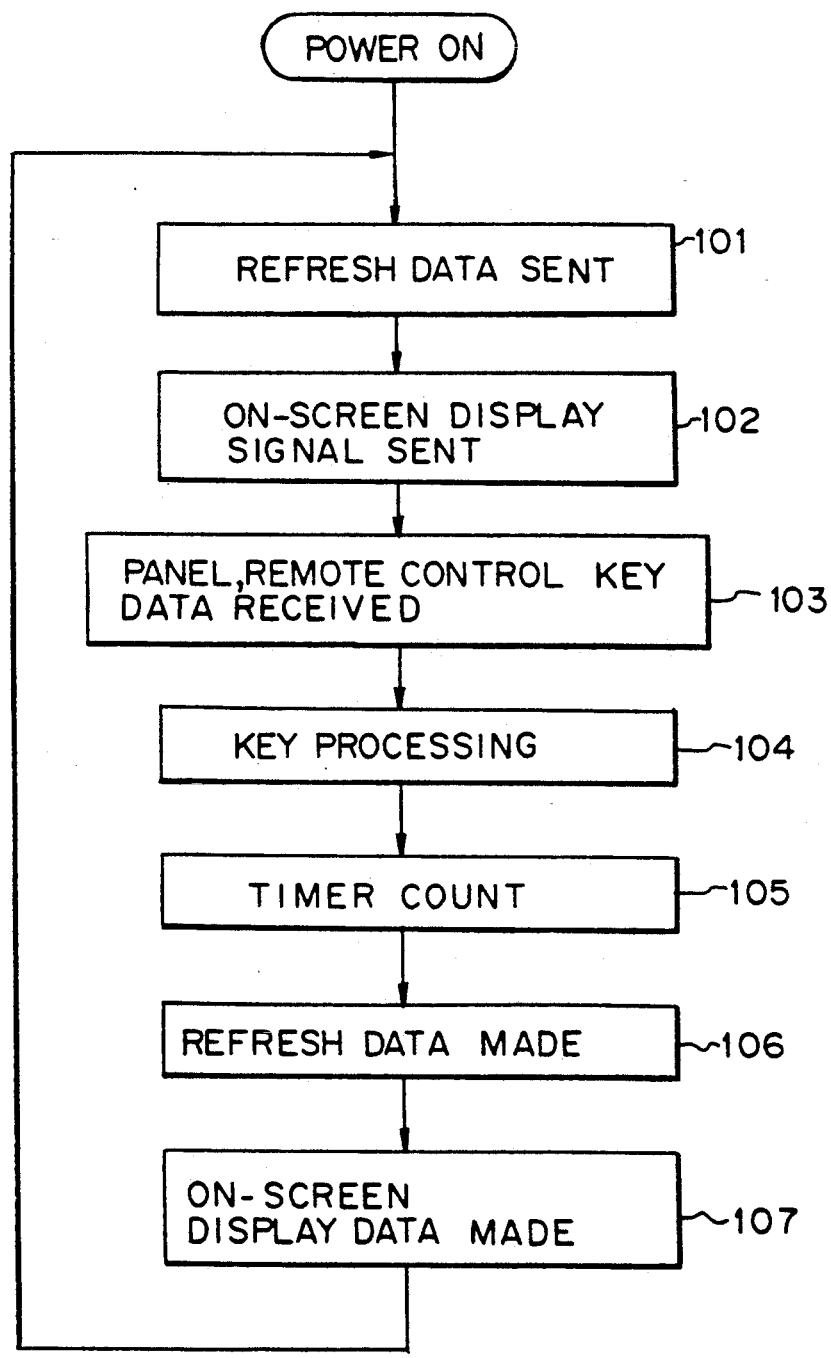
FIG. 2 is flow chart showing operations of a processor unit.

An embodiment of the invention is explained below with reference to FIGS. 1 to 3. FIG. 1 shows an arrangement of a circuit for discriminating a controlled status and making an on-screen display signal, which can be applied to this invention. In the arrangement of FIG. 1, a video signal is fed to a video signal processor 2 through an input terminal 1, and an audio signal is fed to an audio signal processor 4 through an input terminal 3. The video signal processor 2 and the audio signal processor 4 are controlled by a processor unit 5.

To the processor unit 5 are coupled a key manipulator 6, an optical detector 7, a RAM 9 and so on. When one of various keys provided in the key manipulator 6 is manipulated, a signal corresponding to the key manipulated is made in the key manipulator 6, and it is sent to the processor unit 5. The optical detector 7 receives and decodes a remote control signal from a remote control commander 8, and sends an obtained signal to the processor unit 5.

In response to the signal from the key manipulator 6 or the signal from the optical detector 7, the processor unit 5 identifies the item to be controlled, such as brightness, sharpness and volume, and the control level, i.e., the analog value, for the item to be controlled.

As will be described later, the processor unit 5 classifies the control items into a first control class and a second control class, and produces various kinds of control signals, screen display signals SDP, and so on, which are associated with respective classes. Items in the first control class are those for which a user needs knowledge on the current status, that is, the mode, the analog value, and so on, before he or she controls the analog value. Items in the second class are those for which the user need not know the current status before he or she controls the analog value.

If an item to be controlled belongs to the first control class, the processor unit 5 produces character data on identification of the item and its current analog value in the form of an on-screen display signal SDP, and gives the on-screen display signal SDP to an adder 10. The adder 10 superimposes the on-screen display signal SDP supplied from the processor unit 5 on the video signal supplied from the video signal processor 2. A signal obtained by superimposing the on-screen display signal 5 on the video signal is output through a terminal 11 to a CRT display (not shown) and displayed thereon.

After this, in response to the signal indicative of a controlled item and its analog value, which is supplied from the key manipulator 6 or the remote control commander 8 through the optical detector 7, the processor unit 5 produces character data in the form of the on-screen display signal SDP, which indicates the item to be controlled and its new analog value, i.e., the level of the status after adjustment, and supplies the on-screen display signal SDP to the adder 10. Also in response to the signal indicating the item to be controlled and its analog value, which is supplied from the key manipulator 6 or the remote control commander 8 via the optical detector 7, the processor unit 5 produces various kinds of control signals. These control signals are fed to the video signal processor 2, the audio signal processor 4, and so on.

The video signal processor 2 controls the video signal in response to the control signals from the processor unit 5. The video signal after the control is fed to the adder 10. The adder 10 superimposes to the video signal from the video signal processor 2 on the on-screen display signal SDP, which is supplied from the processor unit 5 and consists of character data indicating the item to be controlled and its newly set analog value. A signal obtained by superimposing the on-screen display signal SDP on the video signal is output through the output terminal 11 to a CRT display (not shown). The audio signal processor 4 controls the audio signal in response to the control signals supplied from the processor unit 5. The controlled audio signal is output through a terminal 12 to a speaker (not shown).

If the item to be controlled belongs to the second control class, the processor unit 5 produces various kinds of control signals in response to the signal indicating the item to be controlled and its analog value, which is supplied from the key manipulator 6 or the remote control commander 8 via the optical detector 7. These control signals are fed to the video signal processor 2, the audio signal processor 4, and so on. The video signal processor 2 controls the video signal in response to the control signals from the processor unit 5, and the controlled video signal is fed to the adder 10.

After this, in response to the signal indicating the item to be controlled and its analog value, which is supplied from the key manipulator 6 or the remote control commander 8 through the optical detector 7, the processor unit 5 produces character data in the form of the on-screen display signal SDP, which indicates the item to be controlled and its new analog value, i.e., the level of the status after adjustment, and supplies the on-screen display signal SDP to the adder 10.

The adder 10 superimposes to the video signal from the video signal processor 2 on the on-screen display signal SDP, which is supplied from the processor unit 5 and consists of character data indicating the item to be controlled and its newly set analog value. A signal obtained by superimposing the on-screen display signal SDP on the video signal is output through the output terminal 11 to a CRT display (not shown).

The processor unit 5 performs, once a vertical scanning period, its operations such as receipt of the signal from the key manipulator 6 or the optical detector 7, control of the video signal processor 2 and the audio signal processor 4, output of the on-screen display signal SDP, on-screen display of the item to be controlled and its analog value, and so on. Control by the processor unit 5 is explained below with reference to FIG. 2.

In a condition where the power is supplied, in step 101, refresh data originally set in a slave CPU is transferred from a master CPU which is the processor unit 5 in this embodiment. Control then passes to step 102.

In step 102, the on-screen display signal SDP made on the basis of character data such as letters, symbols, figures, etc. to be displayed on the screen is sent from the processor unit 5 to the adder 10. Control then moves to step 103.

In step 103, a signal made by manipulation in the key manipulator 6 or the optical detector 7 is received. Control then passes to step 104.

In step 104, an item to be controlled and its analog value are defined on the basis of the signal supplied from the key manipulator 6 or the optical detector 7. Control then moves to step 105.

In step 105, time is counted. When a predetermined time has passed, control passes to step 106.

In step 106, refresh data is made. If control data for each item to be controlled, i.e. the analog value, for each item to be controlled has been controlled in the upward or downward direction by the key processing in step 104, new data on the analog value is set for each item to be controlled. Control then goes to step 107. In step 107, the on-screen display signal SDP is produced on the basis of character data such as letters, symbols, figures, and so on, to be displayed on the screen. After this, control returns to step 101.

With reference to FIG. 3, next explanation is directed to operations of the processor unit 5, such as receipt of a signal from the key manipulator 6 or the optical detector 7, control of the video signal processor 2 and the audio signal processor 4, output of the on-screen display signal SDP, on-screen display of an item to be controlled and its analog value, and so on.

In step 201, an item to be controlled and its analog value are determined on the basis of a signal supplied from the key manipulator 6 or the optical detector 7. In this step 201, the item to be controlled is classified into one of the following two classes:

(1) First control class:
(1-*a*) Items directly related to the screen status and requiring user's confirmation of the current level of the analog value. Pertinent items are: brightness, aperture, sharpness, phase, chroma, and so forth. Note that the term "phase" indicates the tone of a color while the term "chroma" represents the depth of a color.

(1-b) Items related to the audio status and requiring display of the current mode for confirmation. Pertinent examples are: bass, treble, balance, and so forth.

(2) Second control class:

This contains items to be controlled for which a user himself determines in an absolute level whether the analog value is adequate or not and for which the user need not confirm the current analog value before he controls it. Pertinent examples are: contrast, volume, and so forth.

Only when an item is determined to belong to the first control class in step 201, characters such as letters, symbols, figures, etc. indicating an item to be controlled and its current analog value are displayed on the screen. After this, control moves to step 202. If the item is determined to belong to the second class, control goes to step 205. If nothing is done in step 201, control moves to the next process.

In step 202, it is determined whether characters such as letters, symbols, figures, etc. indicating an item to be controlled and its current analog value are being displayed on the screen. If they are, control moves to step 203, and if not, control moves to step 204. In step 203, a signal for controlling the analog value is supplied to the processor unit 5 from the key manipulator 6 or the remote control commander 8 through the optical detector 7. In this step 203, on the basis of a control signal output from the processor unit 5, the video signal processor 2 and/or the audio signal processor 4 control(s) the video signal and/or the audio signal in response to an analog value selected for an intended item to be controlled. At the same time, a new analog value after the control is produced in the form of the on-screen display signal SDP. Control then passes to step 204.

In step 204, characters indicating the item to be controlled and its analog value after the control are displayed on the screen on the basis of the on-screen display signal SDP. The display on the screen lasts for a predetermined time, for example, three seconds. Control then passes to the next process.

In step 205, on the basis of a control signal output from the processor unit 5, the video signal processor 2 and/or the audio signal processor 4 control(s) the video signal and/or the audio signal in response to an analog value selected for an intended item to be controlled. At the same time, an analog value after the control is produced in the form of the on-screen display signal SDP. Control then passes to step 206. In step 206, characters indicating the item to be controlled and its new analog value after the control are displayed on the screen on the basis of the on-screen display signal SDP. The display on the screen lasts for a predetermined time, for example, three seconds. Control then moves to the next process.

According to the embodiment, items to be controlled are classified into the first control class, for which a user needs confirmation of the current status, i.e., the current mode, its analog value, and so on, before control of the analog value, and the second control class, for which a user need not confirm the present status. If an item to be controlled belongs to the first control class, its identification and its analog value are once displayed; then a new controlled analog value obtained by controlling the video signal and/or the audio signal is displayed on the screen. If the item belongs to the second control class, the video signal and/or the audio signal is (are) processed immediately, and a new analog value after the control is displayed on the screen. Therefore, different types of on-screen display can be properly used in accordance with the nature of a respective item to be controlled, i.e., whether confirmation of the current status of the item is necessary or not. The television receiver is thus convenient for a user.

The embodiment has been described as being applied to a television receiver; however, the invention may also be used in any desired display means other than television receivers.

Having described a specific preferred embodiment of the present invention with reference to the accompanying drawings, it is to be understood that the invention is not limited to that precise embodiment, and that various changes and modifications may be effected therein by one skilled in the art without departing from the scope or the spirit of the invention as defined in the appended claims.

What is claimed is:

1. A method for displaying a controlled status in a system including manipulation means for adjusting a plurality of items to be controlled, control means coupled to said manipulation means for generating a control signal for adjustment, signal processing means responsive to said control signal for controlling a video signal or an audio signal, and display means for simultaneously displaying a video signal from said signal processing means and an adjusting value of said control signal on a screen, comprising the steps of:

receiving an instruction signal relating to an item of said plurality of items which is to be controlled from said manipulation means and, in response to said instruction signal:

identifying the item to be controlled; and classifying said item to be controlled as being of a first type, for which a user needs confirmation of current status, or a second type, for which a user need not confirm the current status; and then, if said item to be controlled is classified as being of said first type, confirming that a current controlled value is displayed on said display means, and thereafter permitting adjustment by said instruction signal to produce a new controlled value and displaying the new controlled value on said display means; and if said item to be controlled is classified as being of said second type, permitting adjustment by said instruction signal to produce a new controlled value without prior display of a current controlled value and then displaying the new controlled value on said display means.

2. A method for displaying a controlled status according to claim 1 wherein said item to be controlled is related to a television monitor incorporating a CRT display.

3. A method for displaying a controlled status according to claim 2 wherein said item to be controlled which is classified as being of said first type is one of brightness, aperture, sharpness, phase, chroma, bass, treble, and balance, and said item to be controlled which is classified as being of said second type is one of contrast and volume.

* * * * *